(12) United States Patent
Eide et al.

(10) Patent No.: US 7,861,100 B2
(45) Date of Patent: Dec. 28, 2010

(54) METHODS OF PERFORMING MAINTENANCE ON DOUBLE-SLOT PCI DEVICE

(75) Inventors: Curtis Shannon Eide, Rochester, MN (US); Bradley J. Lory, Dubuque, IA (US)

(73) Assignee: International Business Machines Corporation, Armonk, NY (US)

(*) Notice: Subject to any disclaimer, the term of this patent is extended or adjusted under 35 U.S.C. 154(b) by 782 days.

(21) Appl. No.: 11/768,295

(22) Filed: Jun. 26, 2007

(65) Prior Publication Data

US 2009/0006674 A1    Jan. 1, 2009

(51) Int. Cl.
G06F 1/26 (2006.01)

(52) U.S. Cl. .................. 713/300; 713/320; 713/323; 713/324; 710/62

(58) Field of Classification Search .......... 713/300, 713/320, 323, 324; 710/62
See application file for complete search history.

(56) References Cited

U.S. PATENT DOCUMENTS

| | | | | |
|---|---|---|---|---|
| 5,781,744 A | * | 7/1998 | Johnson et al. | 710/304 |
| 5,781,798 A | * | 7/1998 | Beatty et al. | 710/10 |
| 5,860,142 A | * | 1/1999 | Cepulis | 711/202 |
| 6,036,548 A | | 3/2000 | Braithwaite | |
| 6,105,089 A | * | 8/2000 | Chari et al. | 710/302 |
| 6,148,355 A | * | 11/2000 | Mahalingam | 710/104 |
| 6,179,486 B1 | * | 1/2001 | Wallach et al. | 710/302 |
| 7,447,934 B2 | * | 11/2008 | Dasari et al. | 714/5 |
| 7,454,549 B2 | * | 11/2008 | Chari et al. | 710/302 |
| 2005/0270298 A1 | | 12/2005 | Thieret | |

FOREIGN PATENT DOCUMENTS

EP    1383032 A2    1/2004

* cited by examiner

Primary Examiner—Nitin C Patel
(74) Attorney, Agent, or Firm—Dugan & Dugan, PC (57) ABSTRACT

Systems and methods are provided for performing maintenance on a multiple-slot device having multiple adapters in a computer system including a peripheral interface having a plurality of device connection slots. The invention includes determining that a selected slot on the peripheral interface is associated with an adapter of a multiple-slot device, identifying a further slot associated with the multiple-slot device based on the selected slot, and providing power to, or removing power from, the selected slot and the identified further slot. Numerous other aspects are provided.

24 Claims, 8 Drawing Sheets

METHODS OF PERFORMING MAINTENANCE ON DOUBLE-SLOT PCI DEVICE

FIELD OF THE INVENTION

The present invention is generally concerned with peripheral computer equipment, and more specifically related to performing maintenance on a double-slot PCI device.

BACKGROUND

Computer systems may include a peripheral device interconnect system, such as a PCI (Peripheral Component Interconnect) or ISA (Industry Standard Architecture) interface. Such interconnect systems may facilitate the connectivity and configuration of peripheral devices in a computer system. For example, using a PCI interface, a computer system may be able to recognize when a peripheral device has been inserted, identify the location of the port at which it has been inserted, and determine the identity of the installed peripheral device.

Peripheral devices are typically single-slotted, meaning that they may be inserted into a single slot of an interconnect port. However, multiple-slotted devices are now being developed. Since the interconnect systems are generally designed to accommodate single-slot devices, it would be useful to provide a method and system for accommodating multiple-slotted devices.

SUMMARY OF THE INVENTION

In a first aspect of the invention, a method is provided for performing maintenance on a multiple-slot device having multiple adapters in a computer system including a peripheral interface having a plurality of device connection slots. The method includes the steps of determining a selected slot on the peripheral interface is associated with an adapter of a multiple-slot device, identifying a further slot associated with the multiple-slot device based on the selected slot, and providing power to or removing power from the selected slot and the identified further slot.

In a second aspect of the invention, a computer system is provided that is adapted to employ multiple-slot devices. The computer system includes a peripheral interface including a planar having a plurality of device connection slots and a processor coupled to the peripheral interface adapted to execute an operating system to obtain data from and allocate power to the device connection slots of the peripheral interface. The processor is further adapted to determine from data obtained from the peripheral device whether a slot of the peripheral interface is occupied by an adapter of a multiple-slot device, to identify a further slot occupied by a further adapter of the multiple-slot device and to allocate power to occupied slots of the multiple-slot device.

Other features and aspects of the present invention will become more fully apparent from the following detailed description, the appended claims and the accompanying drawings.

DETAILED DESCRIPTION

PCI devices, i.e., peripheral devices that may be used in a PCI interconnect system (also known as PCI cards), conventionally include an adapter that fits into a single slot of a PCI motherboard or planar. New devices have been developed that include multiple standard PCI adapters coupled together, and that take up more than one slot on the planar. For example, devices which include two PCI adapters are known as 'double-slot' devices, as opposed to the conventional 'single-slot' devices. In a multiple-slot device, each of the component adapters may occupy adjacent PCI input slots.

Each slot in a PCI planar typically has a unique identification label. For example, in IBM system i devices, the slot label may provide a location code for a PCI device connection. In some embodiments, the slot label may be stored as non-volatile vital product data (VPD) in the planar. For example, in IBM system i, a series of PCI slots are numbered sequentially from left to right and top to bottom when viewed from the service position, (e.g., from the back of the enclosure which is typically accessed for maintenance purposes).

PCI devices, in turn, usually include locally-stored data often referred to as 'standard PCI config data'. This data may include device ID, vendor ID, subsystem ID and subsystem vendor ID, which are collectively referred to as the PCI config ID. This information uniquely identifies a specific PCI single-slot device or adapter.

In the case of a double-slot PCI device having two adapters coupled together, each of the two adapters, or halves, may include a unique PCI config ID that allows an operating system (OS) to uniquely identify each individual adapter. For example, in a double-slot device, the PCI config IDs may identify a first adapter, which may be, for example, on the left side when viewed from the service position, versus a second adapter, which may be on the right side when viewed from the service position.

Concurrent maintenance of a PCI device refers to adding, removing or replacing the device in a PCI slot during full or partial system operation, (e.g., while the operating system is running). However, a particular slot into which a device is being inserted or from which it is being removed is usually powered off during the operation. In the case of single-slot devices, the PCI slot label of the selected slot is identified and used to power off the slot.

The present invention provides a method and system for enabling the OS to identify a device in question as a multiple-slot device, and then to identify all of the PCI slots associated (or to be associated) with the multiple-slot device, and their orientation with respect to one another. Those slots identified can then be powered off for maintenance operations. According to one or more embodiments of the present invention, the OS determines that a selected slot is associated with a portion of a multiple-slot adapter and then derives the location of the other portion(s) so that all the slots associated with each of the individual adapters in the multiple-slot device may be powered off when the user selects any portion of the device.

Figure 1:
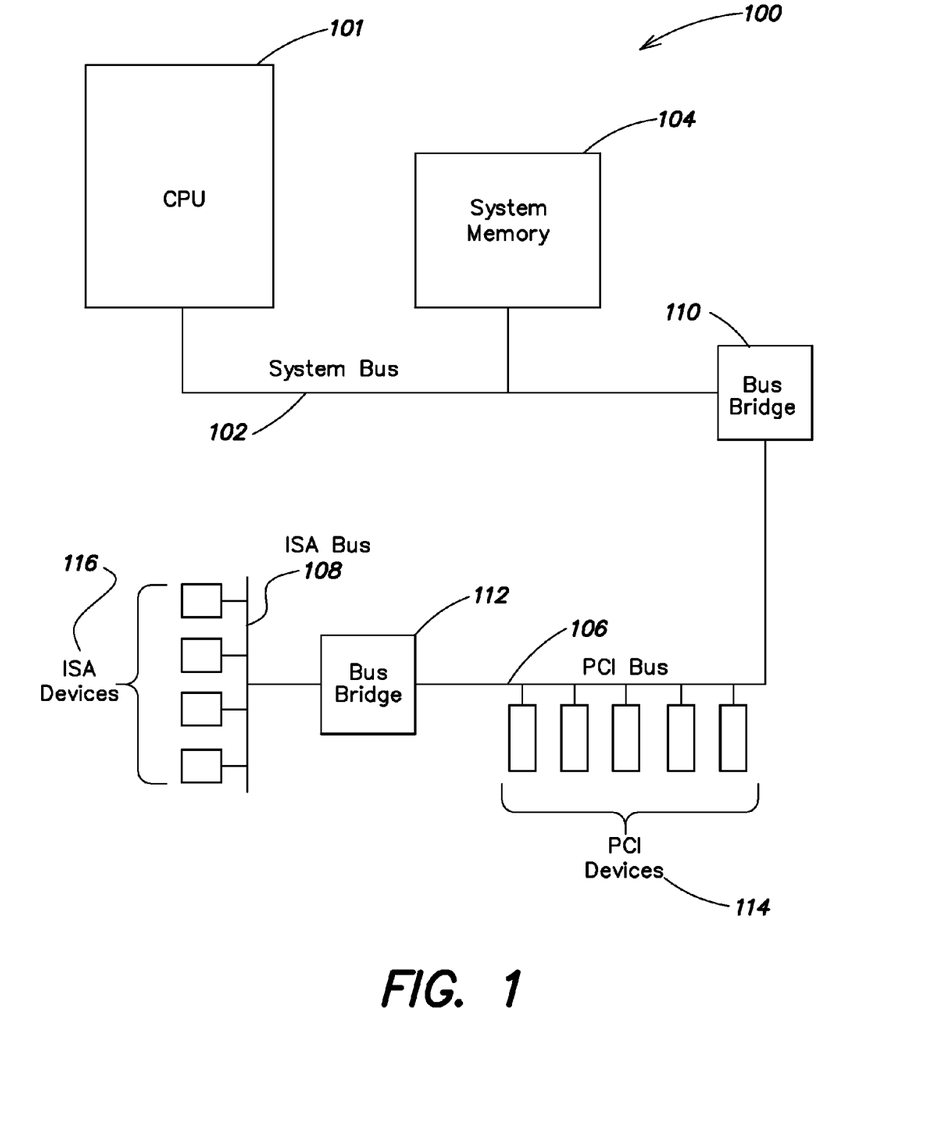
FIG. 1 is a block diagram of a computer system in accordance with an embodiment of the present invention.

With reference to FIG. 1, in one or more embodiments, a computer system 100 may include a processor which may be a central processing unit (CPU) 101 of a computer that is adapted to execute an operating system (among other functions). The CPU 101 is coupled, via a system bus 102, to system memory 104. The CPU 101 is also coupled through the system bus 102 to one or more peripheral buses, such as a PCI bus 106, and/or an ISA bus 108 via bus bridges 110 (between the system bus 102 and the PCI bus 106) and 112 (between the PCI bus 106 and the ISA bus 108). Peripheral devices, e.g., 114, 116 may be coupled to the PCI and ISA buses 106, 108, respectively. In operation, the CPU 101 may transmit information to and receive information from the peripheral devices 114, 116 during execution of the operating system.

Figure 2:
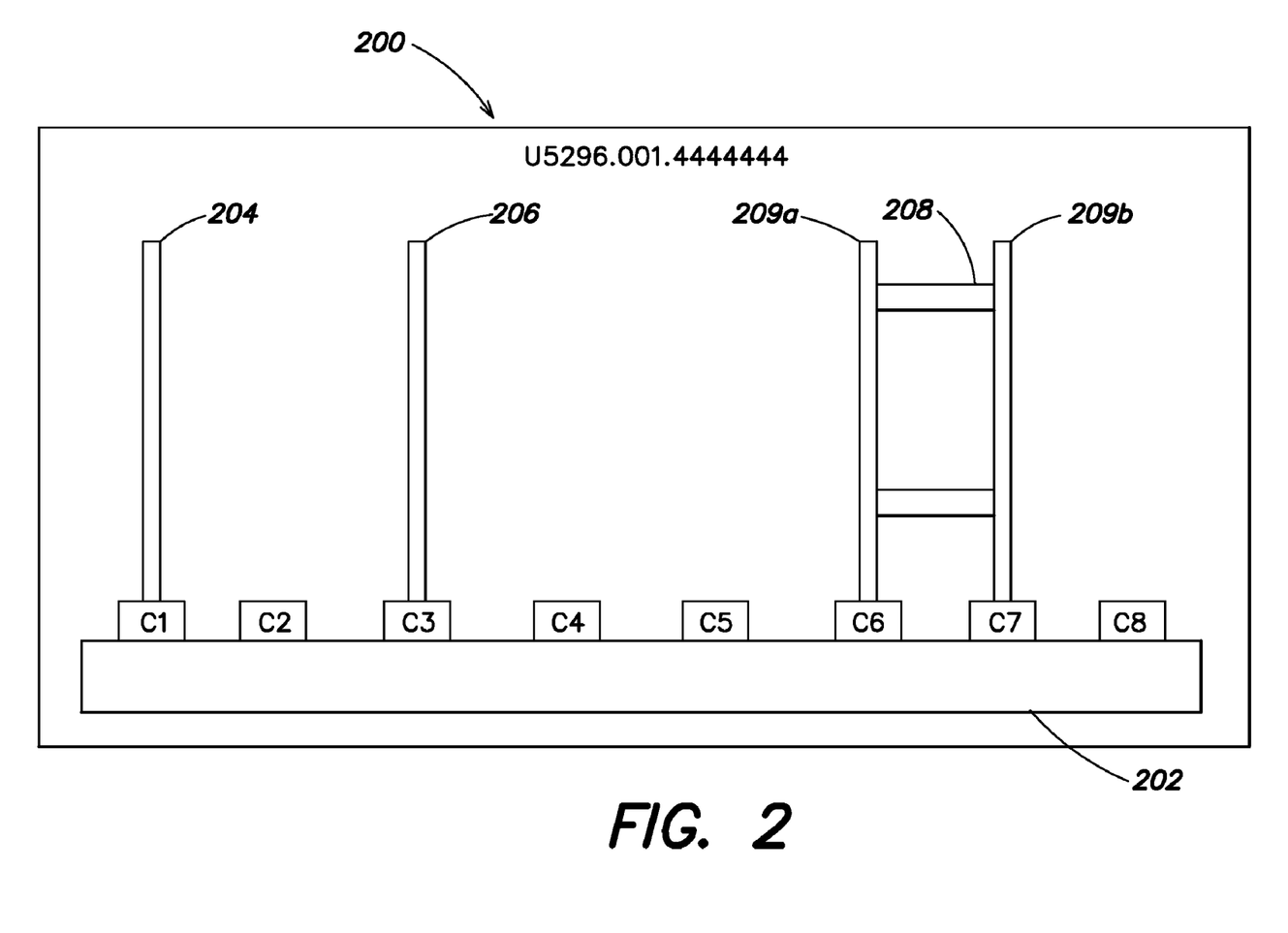
FIG. 2 is a back view of an embodiment of an enclosure, which houses a horizontally oriented I/O planar.

FIG. 2 illustrates a back view of an embodiment of a computer enclosure 200, which houses a horizontally oriented PCI bus or input/output planar ('I/O planar') 202 having slots C1-C8. The enclosure 200 has an enclosure label U5296.001.4444444, which contains data that may indicate that the computer enclosure 200 is a "drawer-style" enclosure housing a horizontally oriented I/O planar 202. The relative numbering of the labels of slots C1-C8 may be a function of the orientation of the enclosure and the direction in which the slots open out. This orientational and directional information is reflected in an identification label, such as custom card identification number 'CCIN' of the I/O planar 202, which may be stored in non-volatile VPD on the I/O planar 202.

The slots C1-C8 of I/O planar 202 are adapted to receive PCI devices. In the horizontal orientation of the I/O planar 202, the slots C1-C8 are oriented vertically, with the result that PCI devices coupled to the slots are oriented vertically as well. The slot labels C1-C8 for the slots on the I/O planar 202 may be stored in non-volatile VPD residing on the I/O planar 202 and may be used as an index for accessing other attributes and characteristics of the slots contained in the VPD. In the exemplary embodiment shown in FIG. 2, slots C1 and C3 are occupied by single-slot PCI devices 204, 206, respectively, and slots C6 and C7 are occupied by a double-slot PCI device 208 having adapters 209a, 209b. Sequential slots may be numbered left-to-right and top-to-bottom according to rules determined by the system architecture. In the case of a horizontally oriented I/O planar 202, the slot of adapter 209a of a double-slot device 208 may be labeled C(x−1), while the slot of adapter 209b may be labeled C(x). For example, the slot of the left half of double-slot device 208 may be labeled C6, and the slot of the right half of double-slot device 208 may be labeled C7.

Figure 3A:
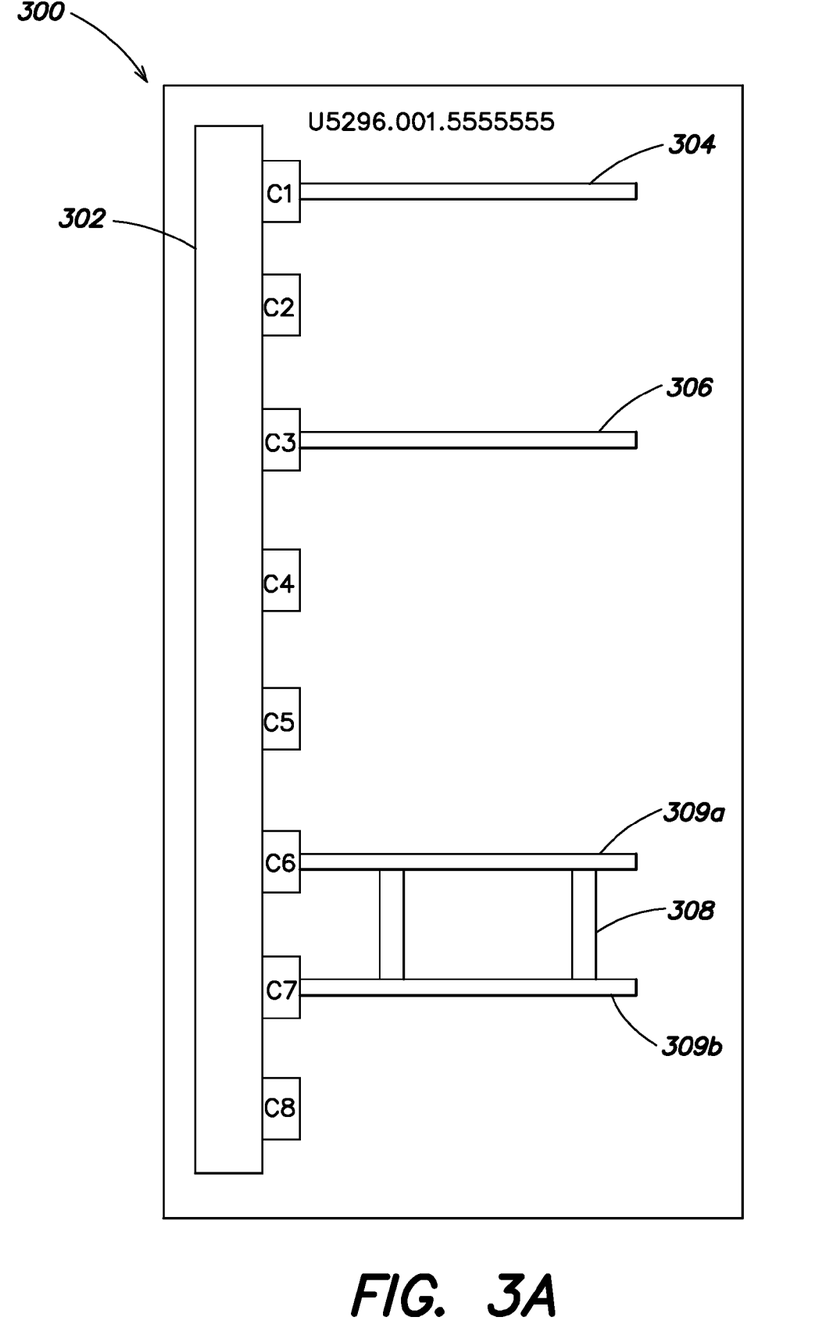
FIG. 3A is a back view of an embodiment of an enclosure, which houses a vertically oriented I/O planar having slots extending rightwards from the I/O planar.

FIG. 3a illustrates a back view of an exemplary embodiment of another computer enclosure 300, which houses a vertically oriented I/O planar 302 having slots C1-C8 extending rightwards from the I/O planar 302 when viewed from the service position. The example label of the enclosure, U5296.001.5555555, includes information which indicates that the enclosure 300 is a "tower-style" enclosure housing a vertically oriented I/O planar 302 situated on a left side of the enclosure interior when viewed from the service position. In this case, the planar slots C1-C8 and PCI devices coupled to the slots C1-C8 are oriented horizontally. In the depicted example, slots C1 and C3 are occupied by single-slot PCI devices 304, 306, respectively, and slots C6 and C7 are occupied by a double-slot PCI device 308 having adapters 309a and 309b. The slot label of the left half adapter 309a of double-slot device 308 is C6, and the slot label of the right half adapter 309b of double-slot device 308 is C7.

Figure 3B:
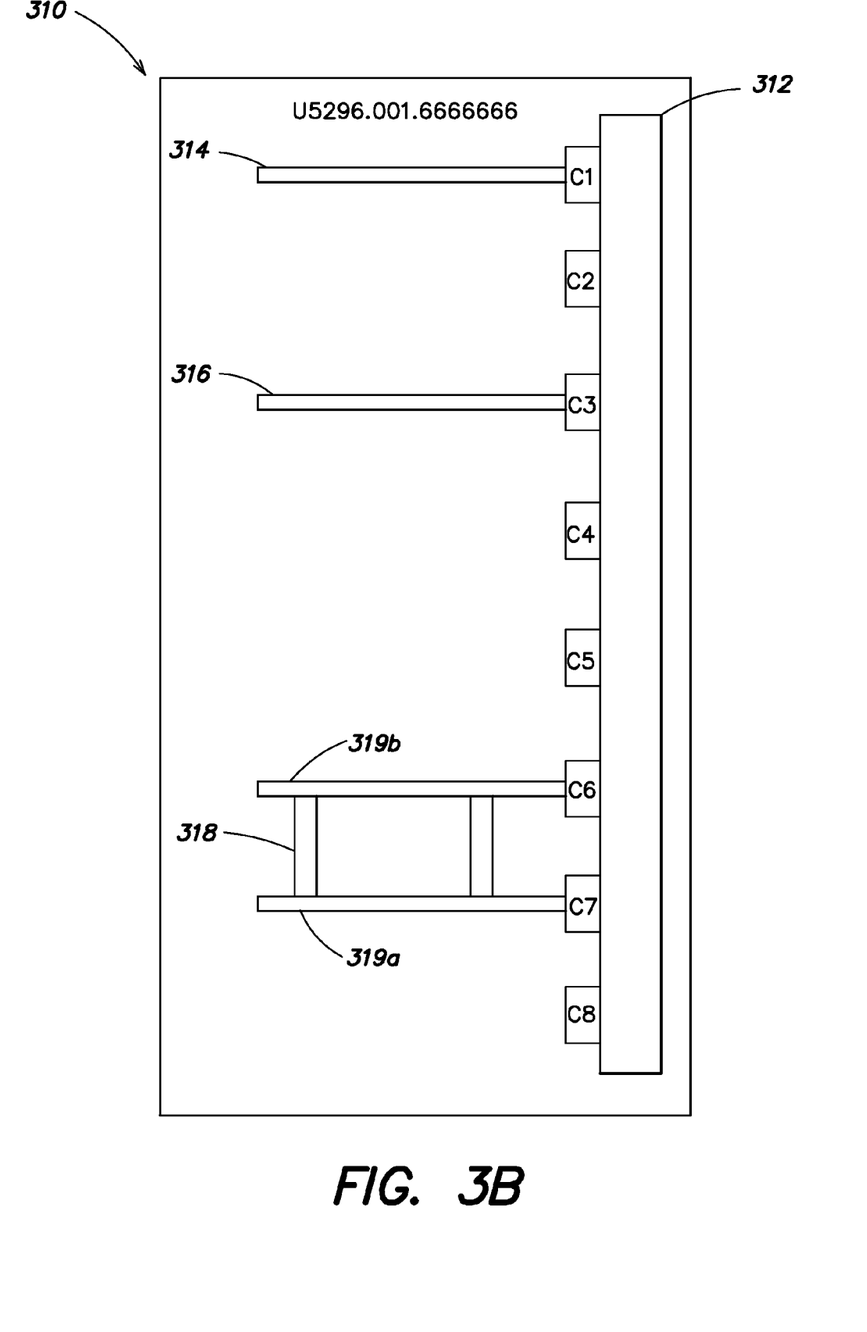
FIG. 3B is a back view of an embodiment of an enclosure, which houses a vertically oriented I/O planar having slots extending leftwards from the I/O planar.

FIG. 3b illustrates a back view of another example embodiment of a computer enclosure 310, which houses a vertically oriented I/O planar 312 having, in this example, slots C1-C8 extending leftwards from the I/O planar 302 when viewed from the service position. The example label of the enclosure, U5296.001.6666666, includes information which indicates that the enclosure 310 is a "tower-style" enclosure housing a vertically oriented I/O planar 312 situated on the right side of the enclosure interior when viewed from the service position. The planar slots C1-C8 and PCI devices coupled to the slots C1-C8 are oriented horizontally. In this instance, slots C1 and C3 are occupied by single-slot PCI adapters 314, 316, respectively, and slots C6 and C7 are occupied by a double-slot PCI adapter 318. In the exemplary left-to-right and top-to-bottom numbering of PCI slot labels (e.g., as the enclosure 310 may be viewed when turned so that the I/O planar 312 is horizontally oriented) the slot label of the left half of a double-slot device may be labeled as C(x+1) with the slot label of the right half labeled as C(x). Thus, in the depicted example, the slot label of the left half adapter 319a of double-slot device 318 is C7, and the slot label of the right half adapter 319b of double-slot device 318 is C6, in contrast to the labeling depicted in FIGS. 2 and 3a.

As discussed above, the slot labels for the slots on an I/O planar may be stored in non-volatile VPD residing on the I/O planar and may be used as an index to the VPD associated with each slot to access additional information. Similarly, each adapter that is coupled to a slot on an I/O planar in an enclosure and conforms to the PCI standard may include information stored in non-volatile adapter storage. This storage may be referred to as 'standard PCI config space', and the information may be referred to as 'standard PCI config data'.

Figure 4:
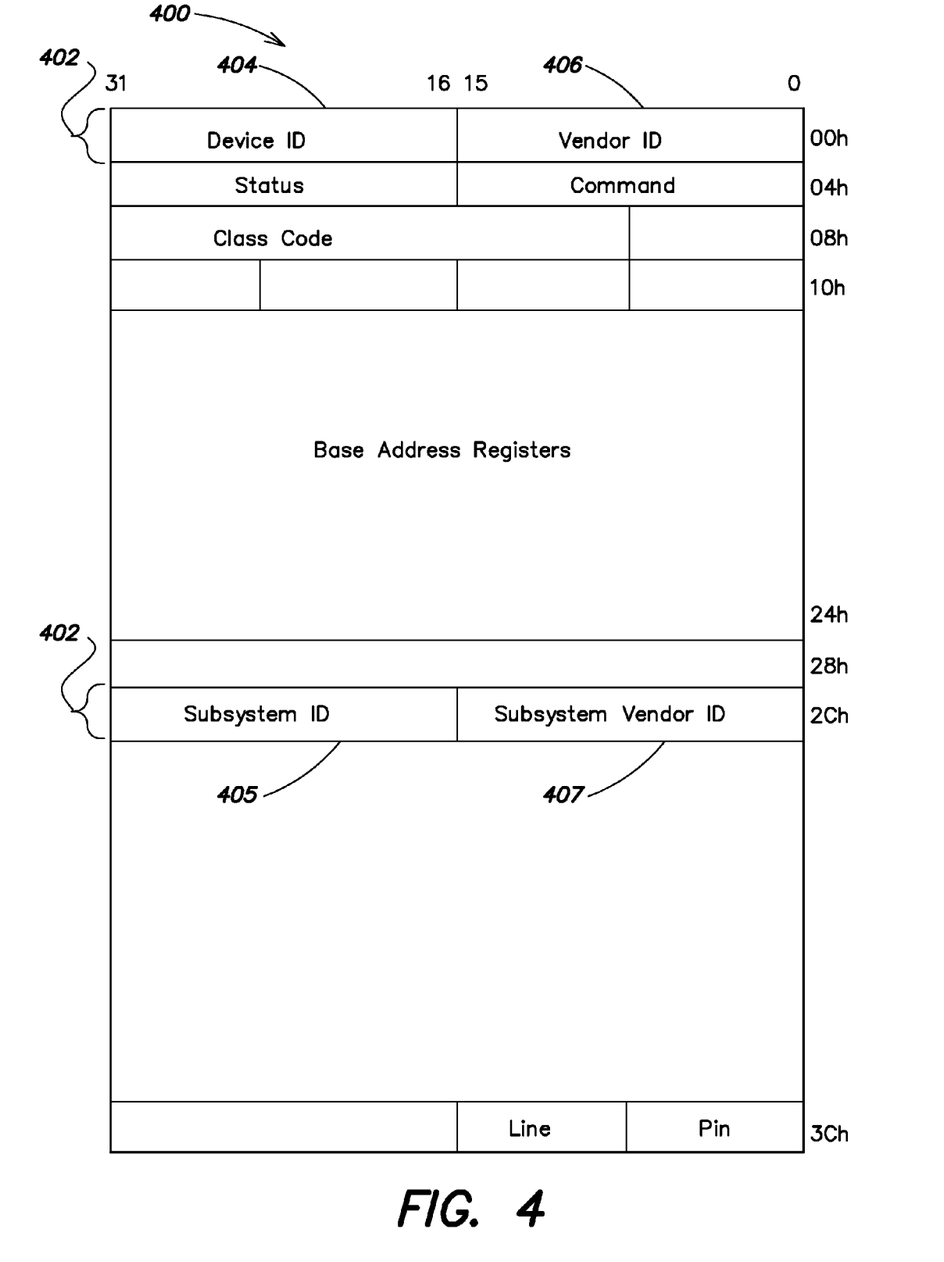
FIG. 4 is an embodiment of a PCI config space.

FIG. 4 illustrates an embodiment of a PCI config space 400. Included in this PCI config space 400 are a device ID, a vendor ID, a subsystem ID, and a subsystem vendor ID, which may be collectively referred to as the 'PCI config ID' 402. As is apparent from the figure, the device and subsystem IDs may be contained in a single fields 404 and 405, respectively, which may have a length of 16 bits, and the vendor and subsystem vendor IDs may be contained in other fields 406 and 407, respectively, which may have a length of 16 bits. Other field sizes may be used. The PCI config ID 402 is intended to uniquely identify a particular adapter. In addition, in the case of a double-slot device, each of the two halves or adapters of a double-slot device may have a unique PCI config ID 402 that may allow the OS to uniquely identify that adapter as the left half or the right half of a double-slot device.

An exemplary method for performing concurrent maintenance on a multiple-slot device, i.e. adding, removing, or replacing the multiple-slot adapter during full or partial system operation, is discussed below with reference to FIGS. 5a and 5b.

Figure 5A:
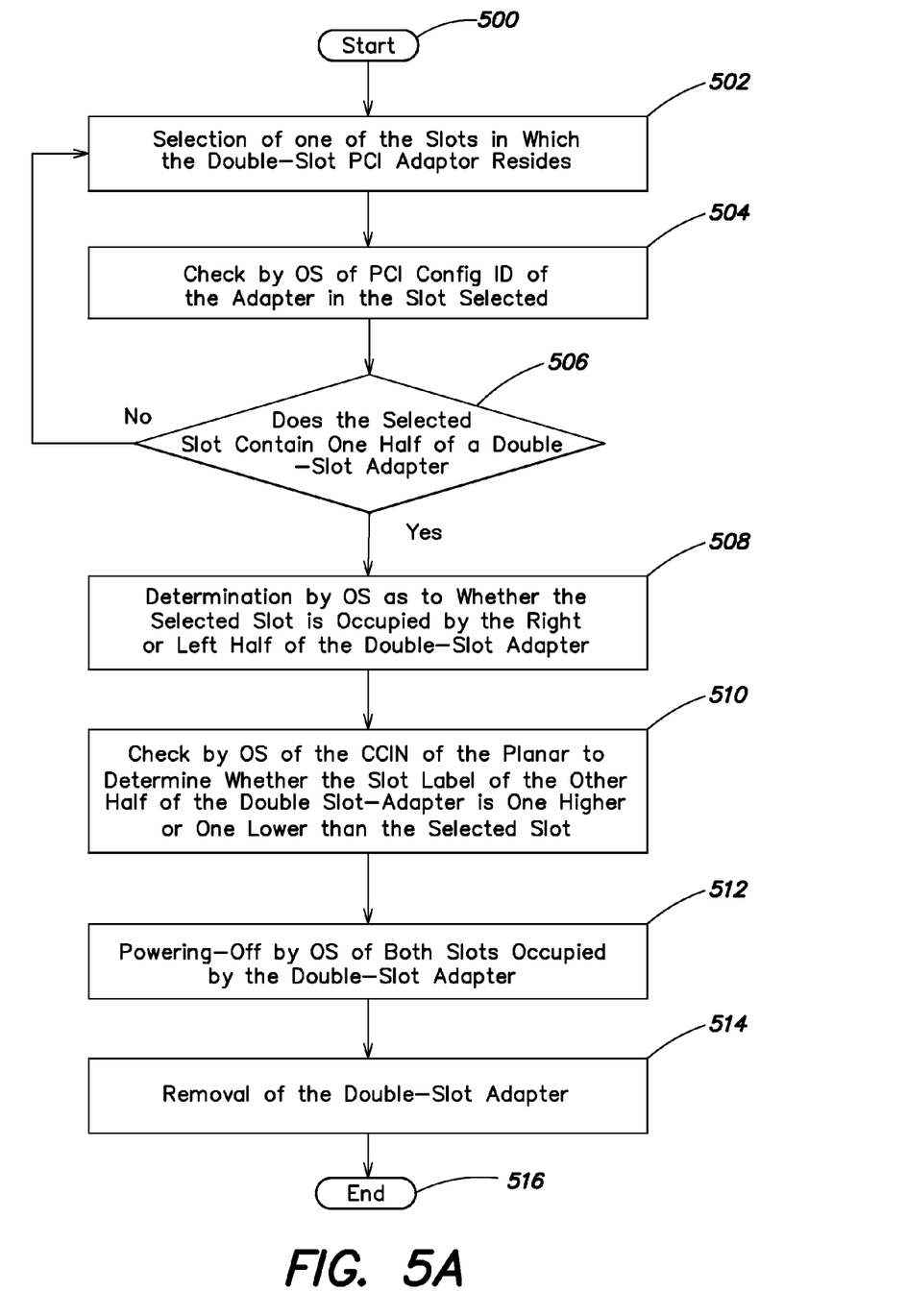
FIG. 5A is an embodiment of a method for removing a double-slot device during system operation.

FIG. 5a illustrates an embodiment of a method for removing a double-slot device during system operation. The method begins at step 500. In step 502, one of the slots in which a double-slot PCI adapter to be removed resides is selected. The selection may be performed by maintenance personnel or any other operator of the computer system. In step 504, the OS accesses the PCI config ID of the adaptor in the selected slot, and determines, in step 506, if the selected slot contains one half, i.e., the right half or the left half, of a double-slot device. If the selected slot is not one half of a double-slot device, then the method cycles back to step 502, and another slot may be selected. If the selected slot is one half of a double-slot device, then the method goes on to step 508.

In some systems, such as for example, IBM system i implementations, each adapter of a double-slot PCI device includes a device ID within the PCI config space that is numbered within a range of values that enables it to be identified as a left half versus a right half (or vice versa) of the double-slot device. For example, the device ID of the left half of a double-slot device may have values within a first specified range and the device ID of the right half of a double-slot device may have values within a second specified range. An advantage of this numbering is that the OS merely checks for a value within the range of values for a left versus right adapter whenever a similar adapter is introduced into the slot.

Referring again to step 508, the OS determines, with knowledge of the selected slot and the PCI config ID, whether the selected slot is occupied by the right or left half of the double-slot device, when the double-slot device is viewed from the service position. Then, in step 510, the OS determines the slot label of the other half of the double-slot device, using the CCIN label of the I/O planar and the numbering rules discussed above with regard to FIGS. 2, 3a, and 3b. In particular, the OS accesses the CCIN label of the I/O planar to determine the label of the other half of the double-slot device, i.e., whether the slot label of the other half of the double-slot device is one higher or one lower than the selected slot. In step 512, the OS subsequently powers off the two slots occupied by the double-slot device, and in step 514, the double-slot device may be removed from the I/O planar. Step 516 marks the end of the exemplary method for removing a double-slot device during system operation.

Figure 5B:
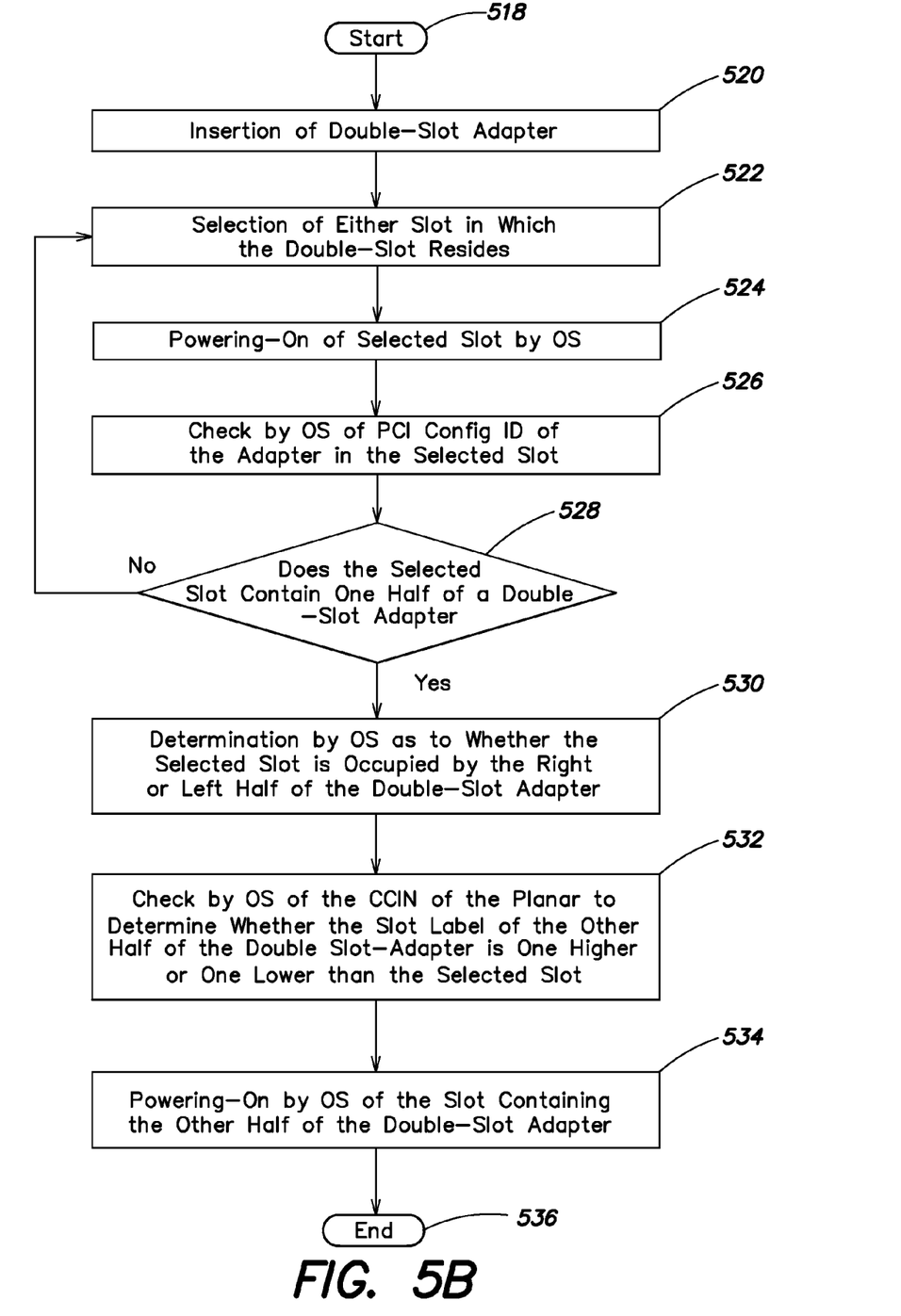
FIG. 5B is an embodiment of a method for adding a double-slot device during system operation.

FIG. 5b illustrates an exemplary embodiment of a method for adding a double-slot device during system operation. The method begins with step 518. In step 520, a double-slot device is inserted into adjacent vacant slots of the I/O planar. The insertion may be performed by maintenance personnel or any other operator of the computer system. In step 522, one of the slots in which the double-slot device has been inserted is selected. The OS then powers on the selected slot in step 524. In step 526, the OS then accesses the PCI config ID of the adaptor inserted in the selected slot to determine, in step 528, whether or not the selected slot contains one half of a double-slot device. If it does not, the method cycles back to step 522, and another slot occupied by the double-slot device may be selected. If the selected slot does contain one half of a double-slot device, the method proceeds to step 530, where the OS accesses the PCI config ID to determine whether the adapter in the selected slot is the left half or the right half of the double-slot device, when the double-slot device is viewed from the service position. In step 532, the OS determines the slot label of the other half of the double-slot device in a manner similar to that discussed in step 510 of FIG. 5a. Finally, in step 534, the OS powers on the slot containing the other half of the double-slot device. Step 536 marks the end of the exemplary method for adding a double-slot device during system operation.

Figure 6:
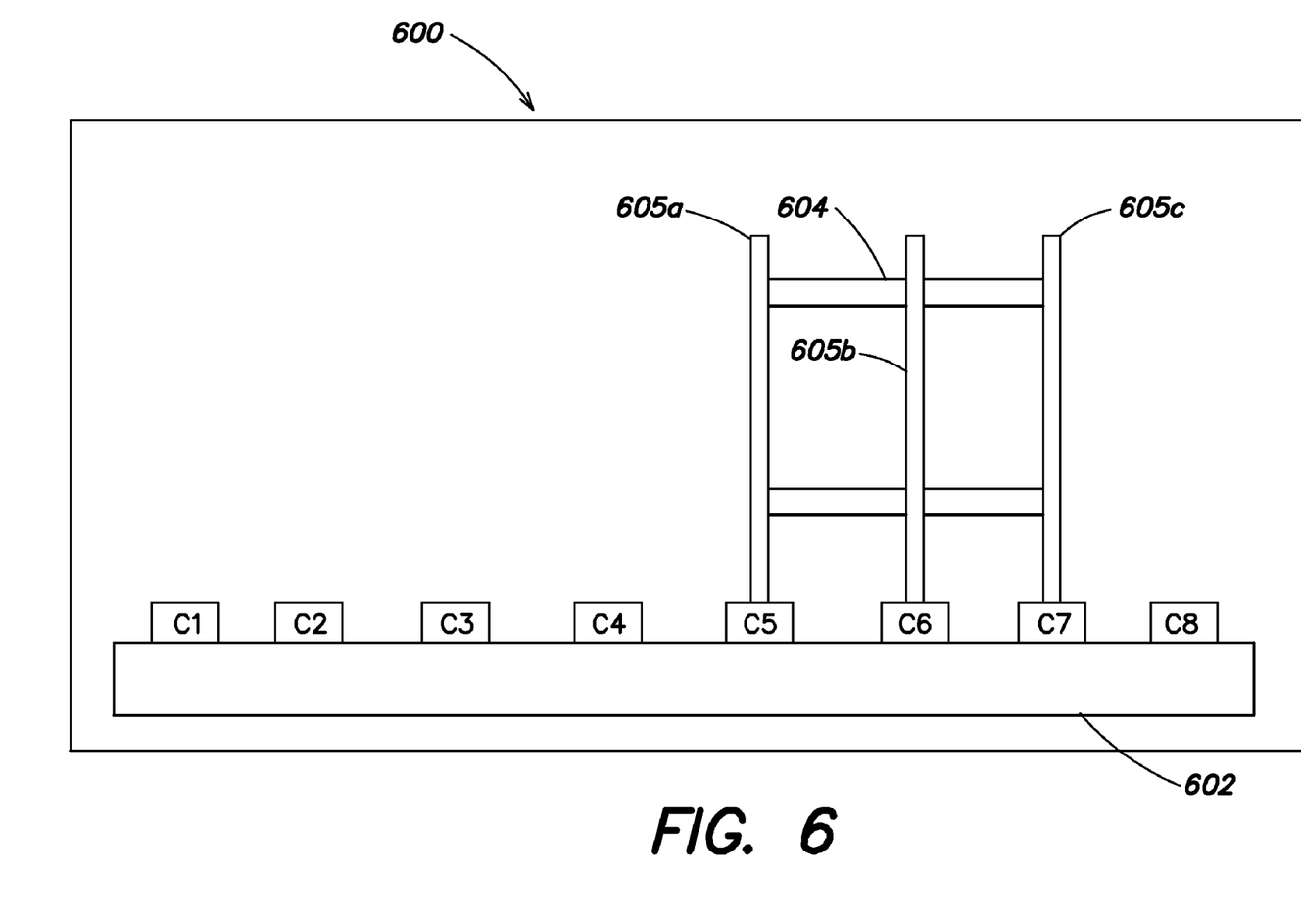
FIG. 6 is a back view of an embodiment of an enclosure, which houses a horizontally oriented I/O planar having slots extending upwards from the I/O planar.

Although these methods have been discussed with reference to a double-slot device, it should be pointed out that they may be applied to multiple-slot devices having any number of adapters (e.g., 2, 3, 4, 6, 8 etc.) by repeating the iterative procedures outlined in the methods above an appropriate number of times. For example, FIG. 6 illustrates an I/O planar 602 having a triple-slot device. As shown, a computer enclosure 600 houses a horizontally oriented I/O planar 602 having slots C1-C8 extending upwards from the I/O planar 602 when viewed from the service position. As can be discerned, slots C5, C6 and C7 are occupied by a triple-slot device 604 having adapters 605a (left), 605b (center) and 605c (right). The slot labels of adapters 605a, 605b and 605c are C5, C6 and C7, respectively.

In the case of performing concurrent maintenance on such a multiple-slot device 604, i.e., removing it from or adding it to the PCI planar 602 during system operation, the methods for doing so are analogous to those described in FIGS. 5a and 5b. For example, the three adapters 605a, 605b and 605c may have information in their PCI config IDs identifying them as the left, middle and right adapters, respectively, of the multiple-slot device 604 (instead of ranges for just the right and left adapters of a double-slot device). Similarly, if, for example, the PCI device were a quadruple-slot device, the PCI config IDs of its adapters would identify them as falling in ranges reserved for the left, center-left, center-right and right adapters, etc.

Additionally, in the case of the multiple-slot device 604 (e.g., a three-adapter device), the OS may use the CCIN of the I/O planar 602 to determine whether the slot labels of the two slots not selected in the methods of FIGS. 5a and 5b are both higher or both lower than the label of the selected slot, or whether the slot label of one unselected slot is one higher and that of the other unselected slot is one lower than the label of the selected slot.

The foregoing description discloses only exemplary embodiments of the invention; modifications of the above disclosed methods and apparatus which fall within the scope of the invention will be readily apparent to those of ordinary skill in the art. For example, in some embodiments, a new VPD term may be added to the standard PCI config space VPD that may directly indicate that an adapter is part of a multiple-slot adapter. This improvement may make it easier for the OS to support multiple-slot devices (e.g., new models) having PCI config IDs that do not fall within the standard, pre-set ranges reserved for multiple-slot devices. In other embodiments, a new VPD term or terms may be added to the I/O planar VPD that may specify the labels of slots adjacent to a slot in question (i.e., one or more consecutive slots to the right and left of the slot in question). This improvement may make it easier for the OS to support I/O planars (e.g., new planar models) having slot labels/numbers that do not follow standard slot labeling rules.

Accordingly, while the present invention has been disclosed in connection with specific embodiments thereof, it should be understood that other embodiments may fall within the spirit and scope of the invention, as defined by the following claims.

The invention claimed is:

1. A method for performing maintenance on a multiple-slot device having multiple adapters in a computer system including a peripheral interface having a plurality of device connection slots, comprising:

inserting a multiple-slot device into the computer system, the multiple-slot device including at least two adapters coupled together, wherein each adapter is inserted into a separate device connection slot of the peripheral interface;

determining whether a selected slot on the peripheral interface is associated with an adapter of the multiple-slot device by:
obtaining a PCI config ID of the adapter in the selected slot, and
identifying the PCI config ID of the adapter as being associated with a multiple-slot device by checking whether the PCI config ID has a value associated with a multiple-slot device;

identifying a further slot associated with the multiple-slot device based on the selected slot by identifying a custom card identification number of the peripheral interface; and providing power to or removing power from the selected slot and the identified further slot.

2. The method of claim 1, further comprising:
prior to identifying the further slot, identifying the specific adapter of the multiple-slot device that is associated with the selected slot.

3. The method of claim 2, wherein identifying the specific adapter of the multiple-slot device that is associated with the selected slot comprises identifying a PCI config ID of the specific adapter.

4. The method of claim 3, wherein identifying the specific adapter of the multiple-slot device that is associated with the selected slot further comprises checking if the PCI config ID of the specific adapter has a value associated with corresponding adapters of similar multiple-slot devices.

5. The method of claim 2, wherein the multiple-slot device includes two adapters.

6. The method of claim 5, wherein identifying the specific adapter of the multiple-slot device that is associated with the selected slot comprises determining whether the specific adapter is a left-half adapter versus a right-half adapter.

7. The method of claim 1, wherein determining a selected slot on the peripheral interface is associated with an adapter of a multiple-slot device comprises identifying a term in a PCI config space of the adapter that specifies that the adapter is part of a multiple-slot device.

8. The method of claim 1, wherein identifying a further slot associated with the multiple-slot device based on the selected slot further comprises checking if the custom card identification number of the peripheral interface corresponds to a value, which identifies a specific orientation of the peripheral interface inside an enclosure housing the peripheral interface.

9. The method of claim 1, wherein identifying a further slot associated with the multiple-slot device based on the selected slot comprises identifying a term in a vital product data (VPD) of the peripheral interface that specifies a slot label of at least one slot adjacent to the selected slot.

10. A computer system for employing multiple-slot devices comprising:
a peripheral interface including a planar having a plurality of device connection slots;
a multiple-slot device including at least two adapters coupled together, wherein each adapter is inserted into a separate device connection slot of the planar;
a processor coupled to the peripheral interface, for executing an operating system, the operating system for obtaining data from and for allocating power to the device connection slots of the peripheral interface, and further for:
determining from data obtained via the peripheral device whether a slot of the peripheral interface is occupied by an adapter of a multiple-slot device by:
obtaining a PCI config ID of the adapter in the selected slot, and
identifying the PCI config ID of the adapter as being associated with a multiple-slot device by checking whether the PCI config ID falls within a specified range;
identifying a further slot occupied by a further adapter of the multiple-slot device by identifying a custom card identification number of the planar; and
allocating power to occupied slots of the multiple-slot device.

11. The computer system of claim 10, wherein prior to the step of identifying a further slot occupied by a further adapter of the multiple-slot device, the processor determines from data obtained via the peripheral device whether the slot of the peripheral interface is occupied by a specific adapter of the multiple-slot device.

12. The computer system of claim 11, wherein in determining from data obtained from the peripheral device whether the slot of the peripheral interface is occupied by a specific adapter of the multiple-slot device, the processor identifies a PCI config ID of the specific adapter.

13. The computer system of claim 12, wherein in determining from data obtained from the peripheral device whether the slot of the peripheral interface is occupied by a specific adapter of the multiple-slot device, the processor is checks if the PCI config ID of the specific adapter has a value associated with corresponding adapters of similar multiple-slot devices.

14. The computer system of claim 10, wherein the planar includes a memory for storing data related to labels of the device connection slots on the planar.

15. The computer system of claim 14, wherein for each device connection slot, the data related to labels of the device connection slots on the planar comprise the label of the specific device connection slot.

16. The computer system of claim 15, wherein for each device connection slot, the data related to labels of the device connection slots on the planar further comprise, if applicable, the labels of one or more adjacent slots to the right and left of the specific device connection slot.

17. The computer system of claim 10, wherein each adapter of the multiple-slot device includes configuration information and the processor is obtains the configuration information of each adapter of the multiple-slot device while it occupies slots of the planar.

18. The computer system of claim 17, wherein the configuration information of each adapter comprises a device ID, a vendor ID, a subsystem ID, and a subsystem vendor ID.

19. The computer system of claim 18, wherein the configuration information of each adapter further comprises data identifying the adapter as an adapter of a multiple-slot device.

20. The computer system of claim 18, wherein the configuration information of each adapter further comprises data identifying the adapter as a specific adapter of a multiple-slot device.

21. The computer system of claim 10, wherein in determining from data obtained from the peripheral device whether a slot of the peripheral interface is occupied by an adapter of a multiple-slot device, the processor further identifies a term in a PCI config space of the adapter that specifies that the adapter is part of a multiple-slot device.

22. The computer system of claim 10, wherein in identifying a further slot occupied by a further adapter of the multiple-slot device, the processor checks if the custom card identification number of the planar corresponds to a value which identifies a specific orientation of the planar inside an enclosure housing the planar.

23. The computer system of claim 10, wherein the planar includes vital product data (VPD).

24. The computer system of claim 23, wherein in identifying a further slot occupied by a further adapter of the multiple-slot device, the processor identifies a term in vital product data (VPD) of the peripheral interface that indicates, if applicable, one or more slots adjacent to the selected slot.

* * * * *